US006102369A

United States Patent [19]

Monger

[11] Patent Number: 6,102,369

[45] Date of Patent: Aug. 15, 2000

[54] SNOWMOBILE JACK STAND

[76] Inventor: Dennis Monger, P.O. Box 2171, Missoula, Mont. 59806

[21] Appl. No.: 09/249,977

[22] Filed: Feb. 12, 1999

Related U.S. Application Data

[60] Provisional application No. 60/074,871, Feb. 17, 1998.

[51] Int. Cl.[7] .......... B60P 1/48

[52] U.S. Cl. .......... 254/8 R; 254/10 R

[58] Field of Search .......... 254/8 R, 9 R, 254/9 B, 9 C, 10 R, 10 B, 10 C, 8 B, 8 C, 2 B, 2 C

[56] References Cited

U.S. PATENT DOCUMENTS

| | | | |
|---|---|---|---|
| 864,902 | 9/1907 | Moore . | |
| 865,987 | 9/1907 | Barlow | 254/10 C |
| 979,098 | 12/1910 | Porteous | 245/10 C |
| 1,203,811 | 11/1916 | Taylor . | |
| 1,275,381 | 8/1918 | Butler . | |
| 1,795,026 | 3/1931 | Hennessy . | |
| 2,121,764 | 6/1938 | Quayle . | |
| 2,840,346 | 6/1958 | Du Moulin | 254/8 C |
| 3,059,904 | 10/1962 | Kimball . | |
| 3,306,579 | 2/1967 | Campbell . | |
| 3,647,237 | 3/1972 | Milton . | |
| 3,667,728 | 6/1972 | Garelick . | |
| 3,807,593 | 4/1974 | Bourton . | |
| 3,860,078 | 1/1975 | Stoick . | |
| 3,863,890 | 2/1975 | Ruffing . | |
| 3,990,593 | 11/1976 | Guger . | |
| 4,085,953 | 4/1978 | Farwell . | |
| 5,145,154 | 9/1992 | Bastille . | |
| 5,174,548 | 12/1992 | Mueller . | |
| 5,211,265 | 5/1993 | Gregg . | |
| 5,441,378 | 8/1995 | Puls . | |
| 5,518,224 | 5/1996 | Anderson . | |
| 5,544,860 | 8/1996 | Craig | 254/7 R |

*Primary Examiner*—David A. Scherbel
*Assistant Examiner*—David B. Thomas
*Attorney, Agent, or Firm*—Dowrey & Associates

[57] ABSTRACT

A jack stand for lifting and supporting a snowmobile which comprises a base frame, preferably on wheels, a front elevating post and two rear elevating posts pivotably attached to the base frame, and a linkage assembly connected to the elevating posts such that the elevating posts all move simultaneously and remain parallel to one another when the elevating posts are pivoted between an elevated position whereat the elevating posts are substantially vertical and a collapsed position whereat the elevating posts are substantially horizontal. The elevating posts each have an outer end constructed and arranged to interface with a portion of the snowmobile. The jack stand also preferably has a latching mechanism that locks the jack stand in its elevated position, and a lever bar selectively attachable to the front post for aiding in moving the jack stand between its collapsed position and its elevated position.

20 Claims, 6 Drawing Sheets

SNOWMOBILE JACK STAND

CROSS-REFERENCE TO RELATED APPLICATIONS, IF ANY

This application claims benefit, under 35 U.S.C. 119(e), of U.S. provisional application Ser. No. 60/074,871, filed Feb. 17, 1998, pending.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention

The present invention relates, generally to lifting devices. More particularly, the invention relates to lifting and supporting dollies for snowmobiles and like devices.

2. Background Information

The prior art includes various devices for lifting and supporting a wide variety of articles and small equipment, including snowmobiles. U.S. Pat. No. 864,902 to Moore, issued in 1907, describes a lift truck on swivelally mounted carrying wheels wherein an upper frame is raised from a lower frame by lever action through a belcrank on pivoting linkages connecting the upper and lower frames. The upper frame is rectangular and oriented horizontally. It remains horizontal as it is raised or lowered. In the decades since, there have been numerous variations on this device, all generally having a rectangular upper frame raised from a lower frame by a levered linkage mechanism.

Variations on these lifting devices also include specific elements for making the devices particularly suited for lifting specific items. U.S. Pat. No. 3,059,904 to Kimball, for instance, discloses a lift for moving household furniture; U.S. Pat. No. 5,174,548 to Mueller discloses a lift for lifting and transport stacking chairs; and U.S. Pat. No. 5,518,224 to Anderson discloses a lift stand for a motorcycle.

With the development of snowmobiles for recreational use, there exists a need to lift the snowmobile off the ground so that its track and drive mechanisms can be serviced, and also to easily move it over a floor or ground not covered with snow.

Snowmobile lifting devices generally fall into one of at least two categories; (1) those which raise the snowmobile slightly off the ground and onto at least one wheeled dolly for transporting the snowmobile, and (2) those which raise the snowmobile much higher off the ground to a convenient height for service and repair.

U.S. Pat. No. 3,860,078 is typical of the first category which includes a wheeled dolly for the rear of the snowmobile and at least one other wheeled dolly for the front. While these devices are suitable for transporting a snowmobile, they are not suited for service or repair of a snowmobile because they do not elevate the snowmobile sufficiently high off the ground to allow access to its underside.

Devices of the second category, such as are disclosed in U.S. Pat. No. 3,863,890 to Ruffing and U.S. Pat. No. 5,211,265 to Gregg, typically are fairly complex and use power assist devices such as a hydraulic cylinder to lift the snowmobile. These devices also have a large rectangular upper frame on which the snowmobile can rest. When the snowmobile is resting on such a frame, it may not be possible to remove the underside access panels. Such a frame also interferes with access to the underside of the elevated snowmobile.

Applicant's invention provides an improved snowmobile lift which overcomes the limitations and shortcomings of the prior art by providing a simple, manually operated lift that supports a snowmobile sufficiently high and allows easy access to the underside of the elevated snowmobile.

BRIEF SUMMARY OF THE INVENTION

The present invention provides a jack stand for lifting and supporting small equipment, such as a snowmobile, which comprises a base frame, three elevating posts pivotably attached to the base frame, and a linkage assembly connected to the elevating posts such that the elevating posts all move simultaneously. The posts remain parallel to one another as they are pivoted between an elevated position with the posts substantially vertical and a collapsed position with the posts substantially horizontal. The base frame is preferably U-shaped with a front member and two side members, and preferably is on wheels that rollably support it on a floor or other surface.

The three elevating posts comprise a front post and two rear posts. The front post has an inner end pivotably attached to the front member of the base frame and an outer end constructed and arranged to interface with a front portion of the snowmobile. Each rear post has an inner end pivotably attached to one of the side members and an outer end constructed and arranged to interface with a rear portion of the snowmobile.

The linkage assembly includes a U-shaped bracket having a base portion fixedly attached normal to the front post, two side arms extending normal to the base portion, and two links, each link pivotably connected between one of the side arms and one of the rear posts. The side arms are parallel to each other and disposed on opposite sides of the front post. They are also angled relative to the front post such that the side arms are angled forward when the front post is vertical, and angled upward when the front post is horizontal pointing rearward. This prevents the jack stand from becoming jammed in its collapsed position. The jack stand also preferably has a latching mechanism that locks the jack stand in its elevated position, and a lever bar selectively attachable to the front post for aiding in moving the jack stand between its collapsed position and its elevated position.

The features, benefits and objects of this invention will become clear to those skilled in the art by reference to the following descriptions, claims and drawings.

DETAILED DESCRIPTION

The snowmobile jack stand of this invention provides a manually-operable lift that can support a snowmobile in an elevated position from three points, two at the rear and one at the front of the snowmobile. Consequently, the underside access panels of a snowmobile can be removed while the snowmobile is supported by the jack stand supports. Furthermore, the jack stand support structure of this invention does not interfere with access to the underside of the elevated snowmobile.

Figure 1:
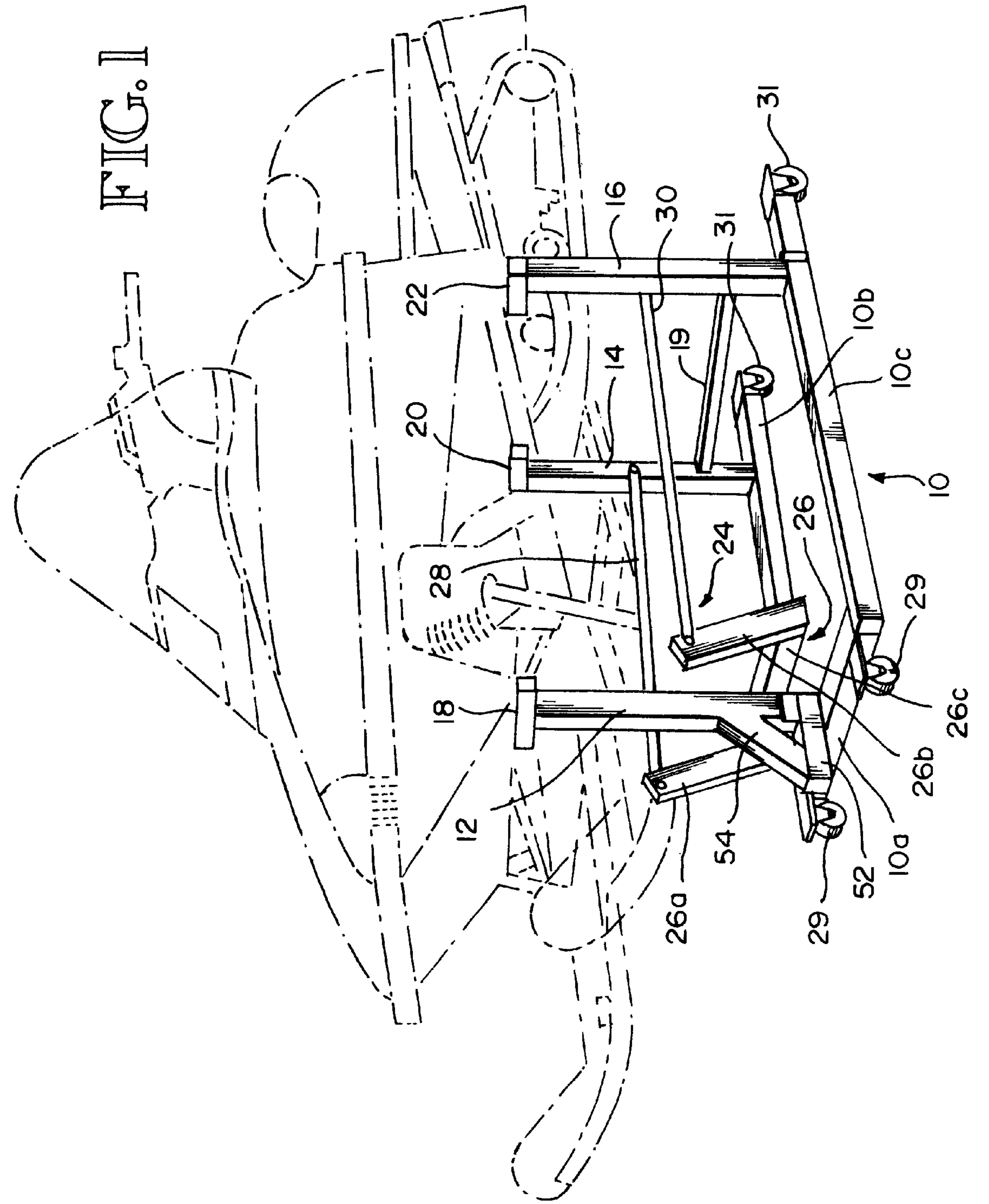
FIG. 1 is a perspective view of the jack stand of this invention in its elevated position with a snowmobile shown in phantom mounted on top of the jack stand.

Referring to FIG. 1, the snowmobile jack stand of this invention comprises a base framework 10 upon which three elevating posts 12, 14, and 16 are pivotally mounted. The outer ends of the elevating posts are fitted with appropriate devices 18, 20 and 22 for supporting the underside of a snowmobile. The elevating posts are connected by a linkage assembly 24 composed of a U-shaped lever 26 and a pair of lifting links 28 and 30. Lever 26 is rigidly fastened to the front, center elevating post 12. The lifting links 20 and 30 are each pivotally attached to one of the rear side elevating posts 14, 16 and to the side arms 26*a*, 26*b* of the lever 26. When the front elevating post 12 is pivoted upward to the vertical position shown in FIGS. 1, 4 and 5, the side arms 26*a* and 26*b* of the lever 26 are also pivoted upward and thereby cause the rear elevating posts 14 and 16 to be simultaneously pivoted to their upright vertical positions.

In a preferred configuration, the three elevating posts 12, 14, 16 are steel tubes 2 in.×3 in. by 22 in. long, and the snowmobile contact devices 18, 20, 22 are steel bars 1 in.×1 in. with the front contact device 18 being 7 in. long. The two rear elevating posts 14, 16 are connected by a stabilizer bar 19 that is rigidly connected to them, as by welding. The stabilizer bar 19 is preferably a steel bar 1 in.×1 in.×21 in. long.

Figure 2:
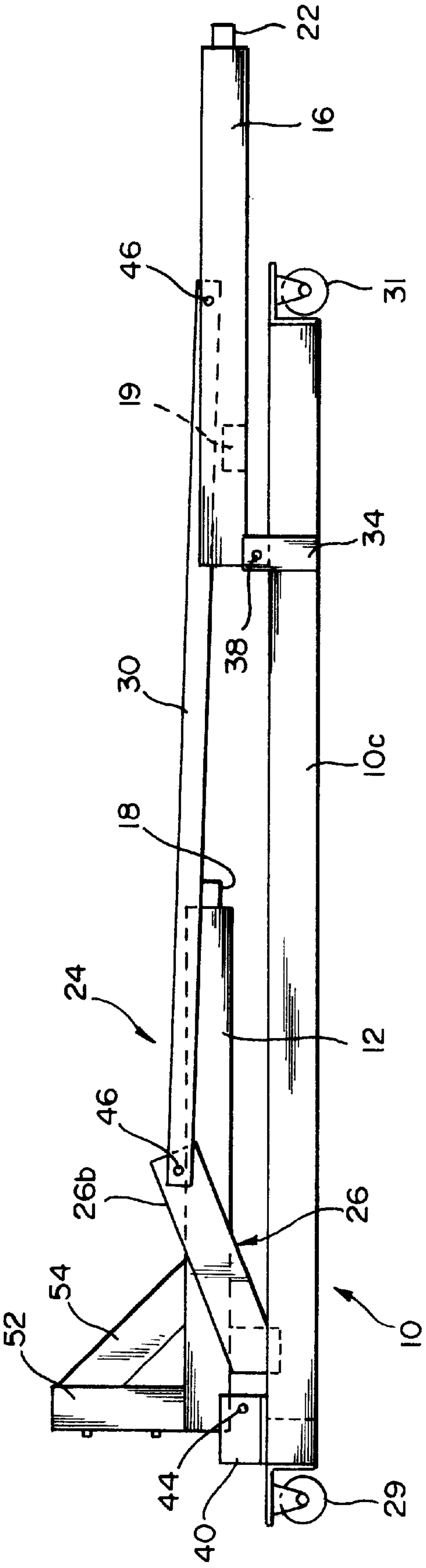
FIG. 2 is a side elevational view of the jack stand in its collapsed position.
Figure 3:
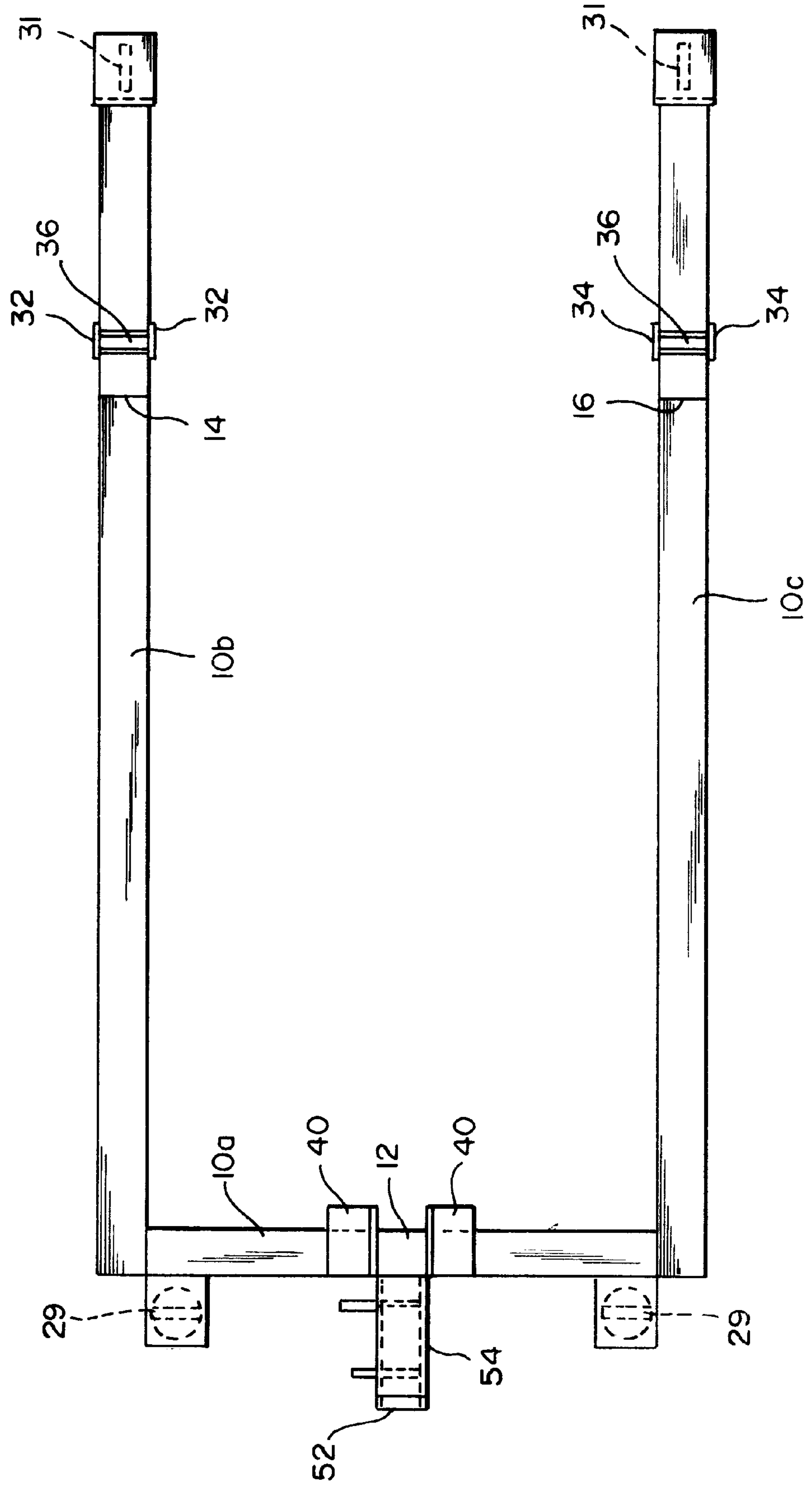
FIG. 3 is a top plan view of the jack stand base framework.

Referring to FIGS. 1 and 3, the base framework 10 comprises a U-shaped steel box tube frame composed of a front steel cross tube 10*a* and two side steel tubes 10*b*, 10*c* that are rigidly fastened, as by welding, to the ends of the front tube 10*a*. In a preferred configuration, the front tube 10*a* is a 2 in.×2 in. steel tube 16 in. in length, and the side tubes 10*b*, 10*c* are 2 in.×2 in. steel tubes 4 ft. in length. The ends of the front tube 10*a* may be supported by castors 29. The rear ends of the side tubes 10*b*, 10*c* may be each supported by a castor 31. The front or the rear castors 29 or 31 may be swivel mounted to the base framework. In a preferred configuration, the front castors 29 are swivel mounted. The castors may be located such that the base framework barely clears the surface upon which it rests, so as to minimize the collapsed height of the jack lift of this invention, as shown in FIG. 2. Casters 29 and 31 preferably are lockable or can be selectively raised or lowered to selectively prevent the framework 10 from rolling.

Figure 4:
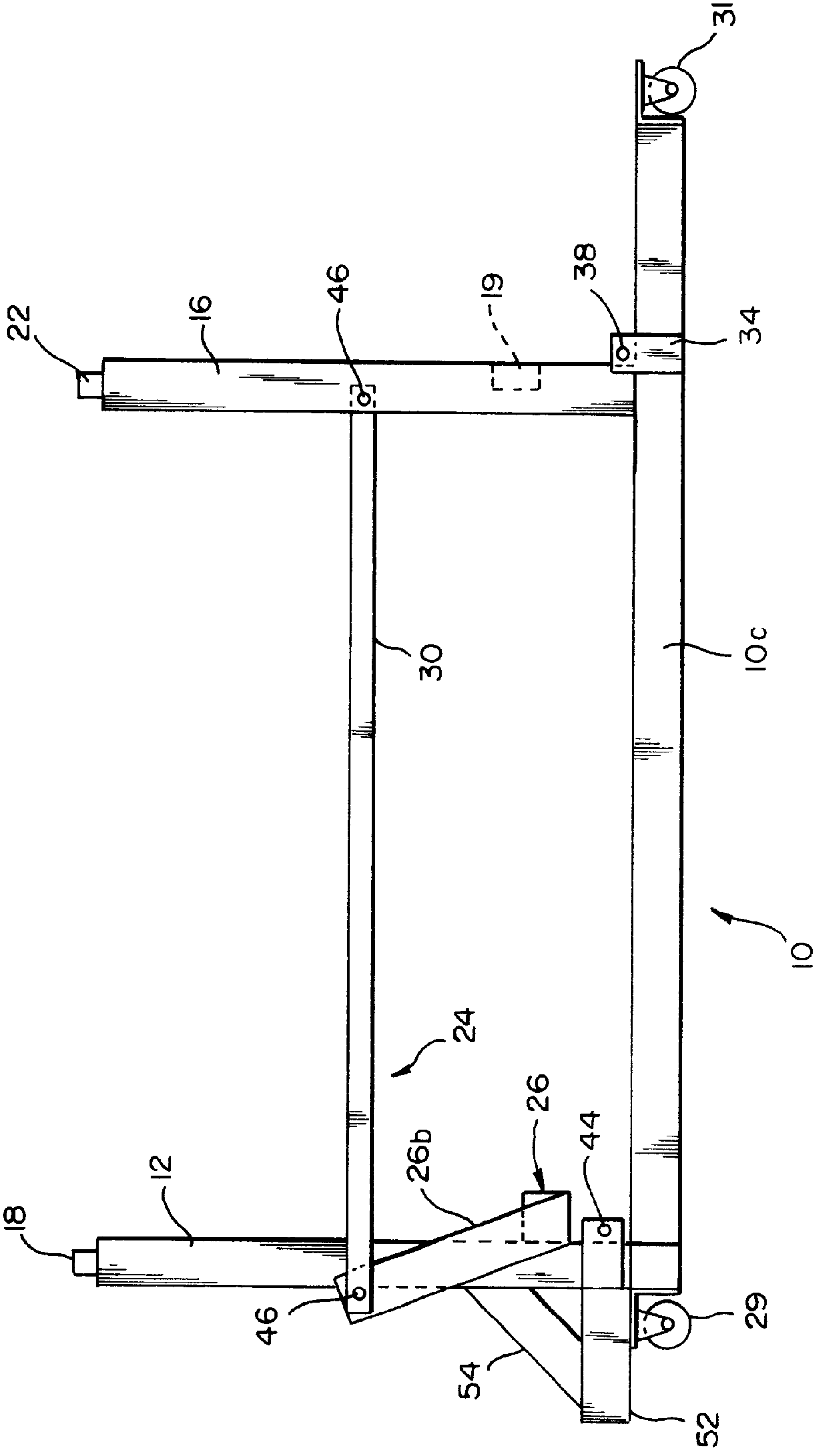
FIG. 4 is a side elevational view of the jack stand in its elevated position.

Referring to FIGS. 2–4, two pairs 32, 34 of steel plates, preferably ¼ in. plates 1½ in.×3 in. are rigidly fastened to the side tubes 10*b*, 10*c*, as by welding, to provide a pair of brackets for mounting the inner ends of the side elevating posts 14, 16. The plates of each bracket pair 32, 34 are fastened to opposite sides of the respective side tube and are provided with a locking pin aperture, preferably abut ¾ in. in diameter. The bottom ends of the side elevating posts 14, 16 are each provided with a locking pin sleeve 36 at a location such that, when the side elevating posts are each assembled on top of the base framework side tubes 10*b*, 10*c*, a locking pin 38 for each post 14, 16 can be inserted through the mounting plate locking pin apertures and through the locking pin sleeve 36 to pivotally fasten that post to the base framework.

Referring to FIGS. 2–6, a pair of steel angle plates, preferably ¼ in. plates 2 in.×2 in. by 3 in. long, are rigidly fasted to the front tube 10*a*, as by welding, to provide a bracket 40 for mounting the inner end of the front elevating post 12. The plates of bracket 40 are fastened to the top of the front post 10*a* and are provided with a locking pin aperture, preferably about ¾ in. in diameter. The bottom end of the front elevating post 12 is provided with a locking pin sleeve 42 at a location such that, when the front elevating post assembly is on top of the base framework front tube 10*a*, a locking pin 44 can be inserted through the mounting plate locking pin apertures and through the locking pin sleeve 42 to pivotally fasten the front post to the base framework.

Figure 5:
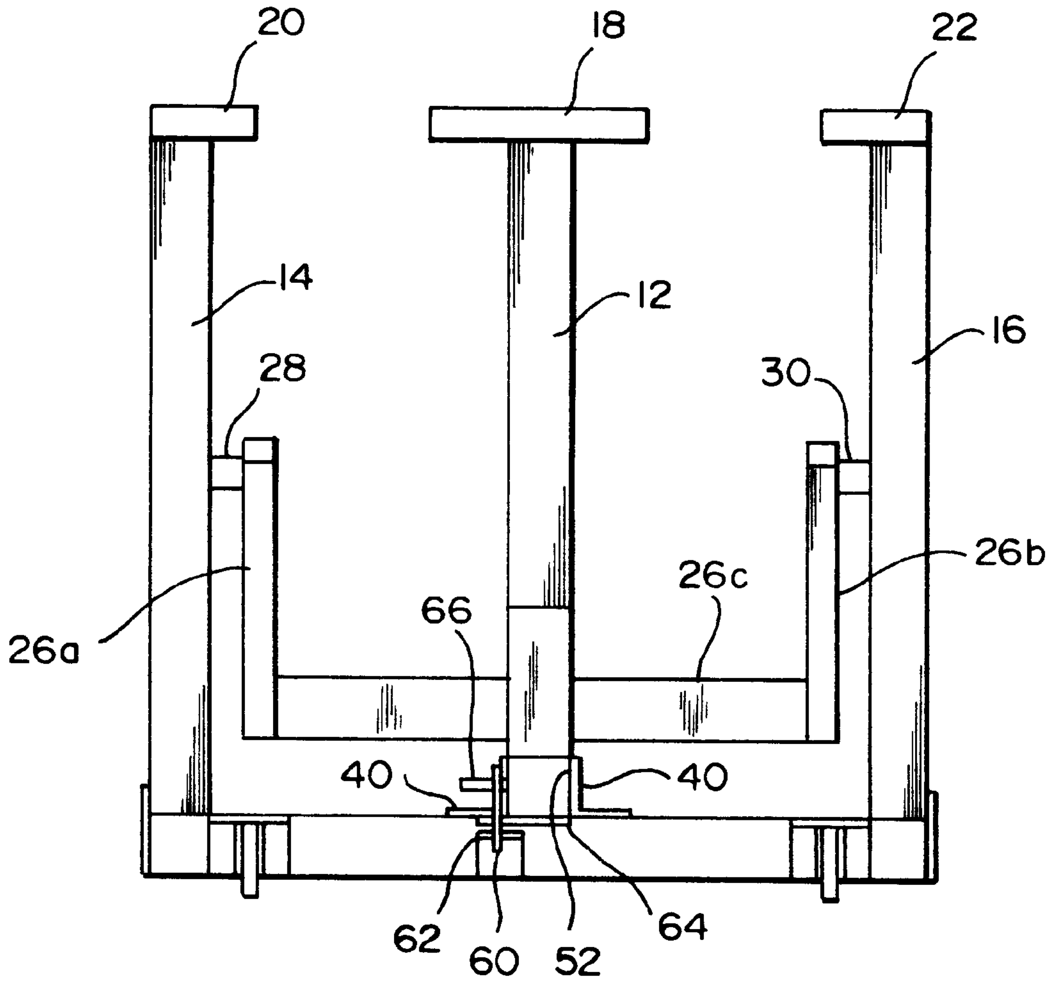
FIG. 5 is a front elevational view of the jack stand in its elevated position.

The U-shaped lever 26 is composed of steel tubing with a cross arm 26*c*, 2 in.×2 in.×16 in. long, mounting the side arms 26*a* and 26*b*. Side arms 26*a*, 26*b* are each 2 in.×2 in.×about 10 in. long. The outer ends of the side arms are each provided with a connecting pin aperture. The cross arm 26*c* is attached, as by welding, to the front post 12 so that the arm extends equal distances on each side of the post and so that the cross arm is perpendicular to the post. The side arms 26*a*, 26*b* are attached, as by welding, to the ends of the cross arm 26*c* so that they are parallel to one another and such that they will be angled forward, as seen in FIG. 4, when the front post 12 is raised to its vertical position, and such that they will be angled upward, as seen in FIG. 2, when the front post 12 is lowered to its collapsed position. As a consequence of this orientation of the side arms 26*a*, 26*b*, the orientation of the lifting links 28, 30, will create an oblique angle with respect to the side arms when the jack lift is collapsed, thereby preventing the jack lift from becoming locked or jammed into its collapsed position. The lifting links are preferably steel bars 1 in.×1 in.×38 inches. long. The lifting links are pivotally pinned to the side elevating posts 14, 16 and to the outer ends of the side arms 26*a*, 26*b* by connecting pins 46. The relative sizes of the U-shaped lever cross arm 26*c*, and the lifting links 28 and 30 are such that the linkage assembly 24 fits between the side elevating posts 14, 16, as shown in FIG. 5.

Devices 18, 20 and 22 at the outer ends of the elevating posts 12, 14, 16 may be selected to meet the requirements of any particular snowmobile configuration. In their simplest form, they could be steel rods or plates formed to seat against the underside of a snowmobile. Because the three elevating post 12, 14, 16 are located as shown in the drawings, devices 18, 20, 22 will support a snowmobile in a three-point pattern, with the rear of the snowmobile supported on two sides and with the front of the snowmobile supported along its longitudinal center line.

The dimensions of the preferred embodiment of the jack lift of this invention will enable the jack lift to straddle the underside of a snowmobile when the lift is in a collapsed position. Then, the lift can be operated to raise a snowmobile to the elevated position shown in FIG. 1. During the elevation procedure, the three posts pivot upward simultaneously and remain parallel to one another so that the snowmobile is kept level as it is elevated. The same is true for the reverse operation when the snowmobile is lowered. Because the contact devices 18, 20, 22 are of relatively small cross-section and preferably have rounded edges, they track or rock along the snowmobile underside as the snowmobile is elevated or lowered, thereby not scratching or marring the snowmobile surface.

Figure 6:
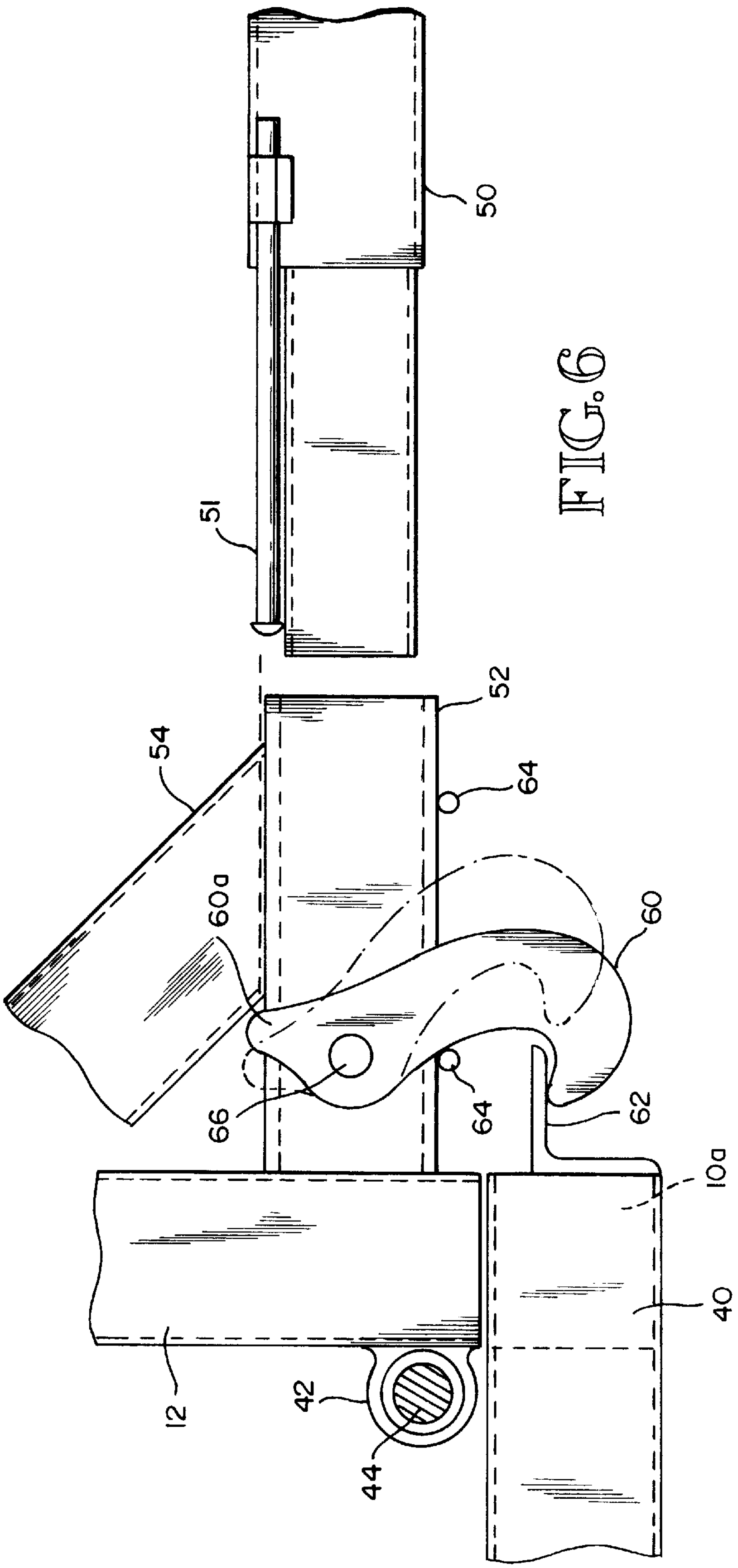
FIG. 6 is an enlarged detailed view of the latching mechanism for locking the jack stand in its elevated position.

Referring to FIG. 6, in a preferred configuration of the jack lift of this invention, the lift is designed to be elevated and collapsed by means of an elongated levering bar or rod 50. A mounting 52 for such a bar or rod is rigidly fastened, as by welding, to the front of the front elevating post 12. In a preferred form, mounting tube 52 may be 3/16 in. steel tube stock 2 in.×2 in.×5½ in. long. The mounting end of the levering bar or rod 50 may be rectangular in cross-section and of a suitable size that it can be slip-fitted into the cavity of the mounting tube 52. The levering bar or rod 50 will be long enough that an operator can pull the bar or rod, once inserted into the mounting tube 52, with enough leverage to elevate the elevating posts 12, 14, 16 to their upright position so as to lift a snowmobile up to the position shown in FIG. 1. The lever bar or rod can be provided with cross-bars, in stair-step fashion, so that an operator can stand up on the bar or rod, much like on a pogo stick, to increase the leverage applied to raise the elevating posts and lift the snowmobile upward. The levering bar or rod can also be provided with one or more cross-handles along the length of the bar or rod. The mounting tube 52 may be attached to the front elevating post 12 by a steel web or a reinforcing member 54 that is welded to both mounting tube 52 and post 12.

Referring to FIG. 6, the lift is preferably provided with a locking mechanism to lock the jack lift in its elevated position so that a loaded jack lift cannot be accidentally collapsed. A preferred locking mechanism would automatically latch when the jack lift was placed in its elevated position. The preferred locking mechanism comprises a latch plate 60 that is pivotally pinned to the mounting tube 52. Plate 60 is configured so that is shape and weight will cause it to pivot into engagement with a latch bracket 62 when the mounting tube 52 is pivoted to horizontal. The underside of the plate 60 is curved so that it can strike the bracket 62 and swing out of the way as the mounting tube 52 is pivoted to the horizontal position. To maintain the plate 60 within a locking range as the mounting tube 52 is pivoted upwardly or downwardly, a pair of limit pins 64 or other limiting elements may be fastened to the underside of the mounting tube 52 as shown. To facilitate unlocking plate 60, plate 60 may be formed to provide an upper lever portion 60*a* on the opposite side of the mounting pin 66 that can be engaged to swing plate 60 out of locking engagement with bracket 62. The levering bar or rod 50 may be provided with an unlocking shaft 51 at the end which engages mounting tube 52. Shaft 51 is designed to contact plate lever portion 60*a* as the levering bar is inserted into the mounting tube 52. This feature enables the automatic unlocking of the jack lift when the levering bar or rod 50 is inserted into the mounting tube 52, and the automatic locking of the jack lift when the levering bar is withdrawn from the mounting tube.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. A jack stand for lifting and supporting equipment, comprising:

(a) a base frame;

(b) no more than three elevating posts pivotally attached to a base frame; and (c) a linkage assembly connected to the elevating posts such that the elevating posts all move simultaneously and remain parallel to one another when the elevating posts are pivoted;

whereby the posts support the equipment when pivoted into an elevated position.

2. The jack stand of claim 1, wherein the elevating posts each have an outer end constructed and arranged to interface with an associated portion of the equipment.

3. The jack stand of claim 1, wherein the jack stand is selectively moveable between an elevated position with the posts substantially vertical, and a collapsed position with the posts substantially horizontal, and wherein the linkage assembly is constructed and arranged so as to prevent the jack stand from becoming jammed in its collapsed position.

4. The jack stand of claim 3, wherein the base frame has a front member and two side members, and wherein the elevating posts comprise a front post pivotally attached to the front member, a first rear post pivotably attached to one of the side members, and a second rear post pivotably attached to the other side member.

5. The jack stand of claim 4, wherein the posts all have inner ends, and the posts are pivotably connected to the base frame at the inner ends.

6. The jack stand of claim 4, wherein the equipment is a snowmobile, and wherein the front post has an outer end constructed and arranged to interface with a front portion of the snowmobile, and wherein both rear posts each have an outer end constructed and arranged to interface with a rear portion of the snowmobile.

7. The jack stand of claim 4, wherein the linkage assembly includes a U-shaped bracket having a base portion fixedly attached normal to the front post, two side arms extending normal to the base portion and parallel to each other and disposed on opposite sides of the front post, and two links, each link being pivotably connected between one of the side arms and one of the rear posts.

8. The jack stand of claim 7, wherein the side arms are disposed at an angle relative to the front post such that the side arms are angled forward when the front post is vertical, and angled upward when the front post is horizontal pointing rearward.

9. The jack stand of claim 4, further comprising a stabilizer bar connected between the two rear posts.

10. The jack stand of claim 4, wherein the base frame is U-shaped.

11. The jack stand of claim 1, further comprising wheels attached to the base frame for rollably supporting the base frame on a floor or other surface.

12. The jack stand of claim 11, wherein the wheels have a mechanism that selectively allows or prevents the base frame from being rolled on a floor or other surface.

13. The jack stand of claim 4, further comprising a lever bar selectively attachable to the front post for aiding in moving the jack stand between its collapsed position and its elevated position.

14. The jack stand of claim 13, wherein the front post has a receptacle for receiving the lever bar.

15. The jack stand of claim 4, further comprising a latching mechanism that locks the jack stand in its elevated position.

16. The jack stand of claim 15, wherein the latching mechanism includes a latch bracket attached to the front member of the base frame and a catch element pivotably attached to the front post, the catch element constructed and arranged to engage the latch bracket when the jack stand is in its elevated position whereby the jack stand is locked in its elevated position.

17. The jack stand of claim 16, wherein the catch element has an unlocking feature that allows it to be pivoted out of engagement with the latch bracket when the jack stand is in its elevated position to allow the jack stand to be lowered to its collapsed position.

18. The jack stand of claim 17, further comprising a lever bar selectively attachable to the front post for aiding in moving the jack stand between its collapsed position and its elevated position, the lever bar having a feature which engages with the unlocking feature of the catch element to unlock the jack stand from its elevated position when the lever bar is attached.

19. A jack stand for lifting and supporting equipment, comprising:

(a) a base frame having wheels that rollably support the base frame on a floor or other surface;

(b) no more than three elevating posts pivotably attached to a base frame, each elevating post having an outer end constructed and arranged to interface with a portion of the equipment;

(c) a linkage assembly connected to the elevating posts such that the elevating posts all move simultaneously and remain parallel to one another when the elevating posts are pivoted between an elevated position whereat the posts support the equipment with the elevating posts substantially vertical, and a collapsed position with the elevating posts substantially horizontal, the linkage being constructed and arranged so as to prevent the jack stand from becoming jammed in its collapsed position; and (d) a latching mechanism that locks the jack stand in its elevated position.

20. A jack stand for lifting and supporting a snowmobile, comprising:

(a) a U-shaped base frame having a front member and two side members, and having wheels that rollably support the base frame on a floor or other surface;

(b) no more than three elevating posts, the three posts being a front elevating post having an inner end pivotably attached to the front member and an outer end constructed and arranged to interface with a front portion of the snowmobile to support it, a first rear elevating post having an inner end pivotably attached to one of the side members and having an outer end constructed and arranged to interface with a rear portion of the snowmobile to support it, and a second rear elevating post having an inner end pivotably attached to the other side member and having an outer end constructed and arranged to interface with a rear portion of the snowmobile to support it;

(c) a linkage assembly including a U-shaped bracket having a base portion fixedly attached normal to the front post, two side arms extending normal to the base portion and parallel to each other and disposed on opposite sides of the front post, the side arms being disposed at an angle relative to the front post such that the side arms are angled forward when the front post is vertical, and angled upward when the front post is horizontal pointing rearward, and two links, each link being pivotably connected between one of the side arms and one of the rear posts, the linkage assembly being constructed and arranged such that the elevating posts all move simultaneously and remain parallel to one another when the elevating posts are pivoted between an elevated position with the elevating posts substantially vertical and a collapsed position with the elevating posts substantially horizontal, the linkage also being constructed and arranged so as to prevent the jack stand from becoming jammed in its collapsed position;

(d) a latching mechanism that locks the jack stand in its elevated position; and (e) a lever bar selectively attachable to the front post for aiding in moving the jack stand between its collapsed position and its elevated position.

* * * * *